D. BROY.
Corn-Planter.
No. {1,113, 32,117.}
Patented Apr. 23, 1861.
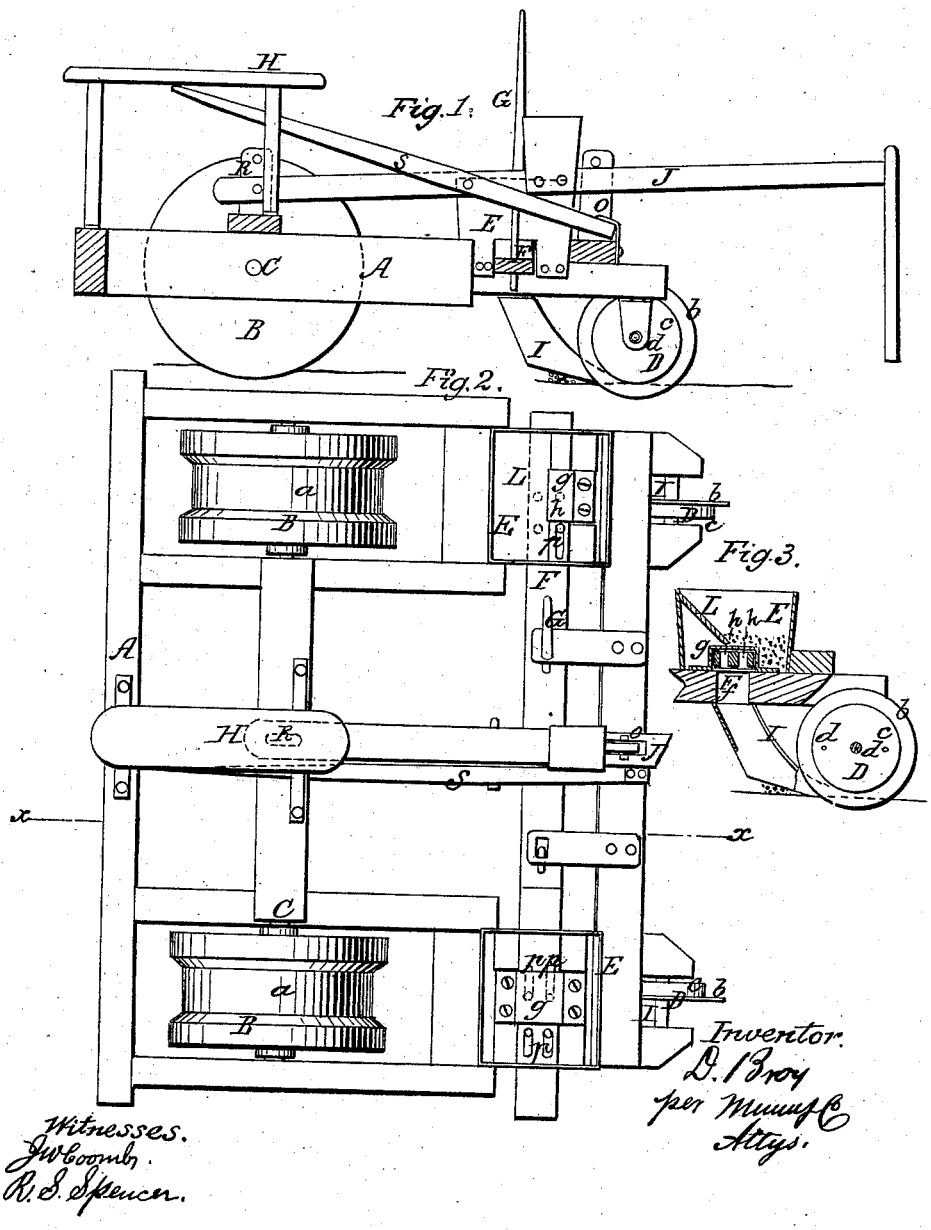

UNITED STATES PATENT OFFICE.

DANIEL BROY, OF CANTON, MISSOURI.

IMPROVEMENT IN SEED-PLANTERS.

Specification forming part of Letters Patent No. 32,117, dated April 23, 1861.

*To all whom it may concern:*

Be it known that I, D. BROY, of Canton, in the county of Lewis and State of Missouri, have invented a new and Improved Seed-Planter; and I do hereby declare that the following is a full, clear, and exact description of the same, reference being had to the accompanying drawings, making a part of this specification, in which—

Figure 1 represents a longitudinal vertical section of my invention, the line $x\ x$, Fig. 2, indicating the plane of section. Fig. 2 is a plan or top view of the same. Fig. 3 is a vertical longitudinal section of the seed dropping device.

Similar letters of reference in the three views indicate corresponding parts.

The object of this invention is to arrange a seed-planter which will open the furrows, drop the seed, and cover it over with ease and facility, and which allows of regulating the depth to which the furrows are opened in a simple, sure, and ready manner.

To enable those skilled in the art to make and use my invention, I will proceed to describe its construction and operation with reference to the drawings.

The frame A is supported in the rear by the two covering-wheels B B, which are secured to the axle C, and in front by the sharp-edged flanged wheels D, which serve to cut through the sod and to open the furrow. The covering-wheels are provided with flat-bottomed grooves $a$, lined with sheet-zinc or other suitable material, and their sides are inclined, so that the dirt is pressed on the seed from both sides, and the wheels are of such width that a flat portion is left on each side of the grooves, thus preventing said wheels cutting into the ground and causing an undue pressure on the seed. By giving to the grooves $a\ a$ flat bottoms I obviate the difficulty arising with sharp-angled grooves generally used with covering-rollers—namely, the liability of such grooves to fill with dirt.

The cutting-wheels D are provided with sharp-edged flanges $b$, which serve as the cutters, and the depth to which these cutters sink into the ground is determined by the rims $c$.

In order to be able to regulate the depth to which the cutters $b$ work, I have attached the rims $c$ by means of screws or rivets $d$, or by any other means which allow of easily removing said flanges, and I have provided several sets of rims of different diameters, so that by taking off one and attaching another set of larger or smaller diameter I am enabled to regulate the depth to which the cutting-wheels D work, according to the nature of the ground and according to the seed to be sown.

On the frame A, and close behind the cutting-wheels D, are the hoppers E, from which the seed is discharged by means of a slide, F. This slide passes through both hoppers, and it is operated by a hand-lever, G, from the driver's seat H. The bottom of each of the hoppers is provided with an oblong slot, $f$, situated about in the center of said bottom and under a scraper, $g$, which forms the guide for the slide in the interior of the hopper, and which at the same time serves to scrape off the surplus seed from the seed-cells $h$. Two pairs of such seed-cells are made in each end of the slide F, of different size, to sow more or less grain, as may be required, in each hill.

To prevent each set of seed-cells from sowing at the same time, I use inclined caps L in each hopper, to cover one set of seed-cells to prevent their action when the other set is doing work. These caps are made to fit on either side of the seed-slide, so that either set of seed-cells can be covered, as desired.

To determine the amount of grain to be sown, I make grooves $p$ in the slides, running out from the seed-cells of sufficient length to prevent their rear or outer end from coming in contact with the scraper. By this connection of grooves and seed-cells the grain is not liable to be cracked or cut, as is the case with sharp-edged seed-cells.

The plows I are made straight on one side, and the other side shear-shaped to open the furrow of sufficient width to deposit the grain in. The sides of the cutting-wheels slightly rub the plows near their points on their straight sides, and their cutting-edges are a little below the points of the plows. Without this arrangement of plows and cutters the plows are liable to clog or choke.

To allow the machine to rise and fall in front to pass over obstructions, or to enable it to be turned around, I attach a lever, $s$, to the pole J, the front end of said lever being fastened to the frame and its rear end running back under the driver's seat. By thus connecting the lever and pole the driver can easily raise the front part of the machine with his foot without changing his position on his seat. The draft-pole J is hinged to a standard, R, attached to the cross-timber between the covering-wheels and above their axis, so that the strain exerted by the draft-animals on the lever bears down upon the cutting-wheels to keep them to their work. The pole can be raised or lowered on the standard to suit the amount of pressure that may be required on the cutting-wheels. Without this arrangement of the draft-pole said cutting-wheels would be liable to do their work imperfectly, and the strain exerted by the draft-pole on the lever is absolutely necessary to insure a correct action of said cutting-wheels under all circumstances, and to cause them to cut through the sod to the depth determined by the flanges c, which are attached to the sides of the cutting-wheels D.

To prevent a lateral motion of the machine, and to enable it to follow the undulations of the ground, I use a guide, o, fastened in the front part of the machine, which passes through a slot or mortise in said pole, which makes a loose coupling there, and leaves the different parts free to do their proper work.

The operation of my seed-planter is very simple, it can easily be managed by one person, and all its parts are so constructed that they do not get easily out of order.

Having thus fully described my invention, what I claim as new, and desire to secure by Letters Patent, is—

The arrangement of the double perforated slide F, inclined cap L, tubes I, cutting-wheels D, and lever G, with the flat-bottomed grooved wheels B and adjustable tongue J, in the manner and for the purpose herein shown and described.

DANIEL BROY.

Witnesses:
J. N. HUGHES,
G. W. THOMPSON.